United States Patent Office 3,205,043
Patented Sept. 7, 1965

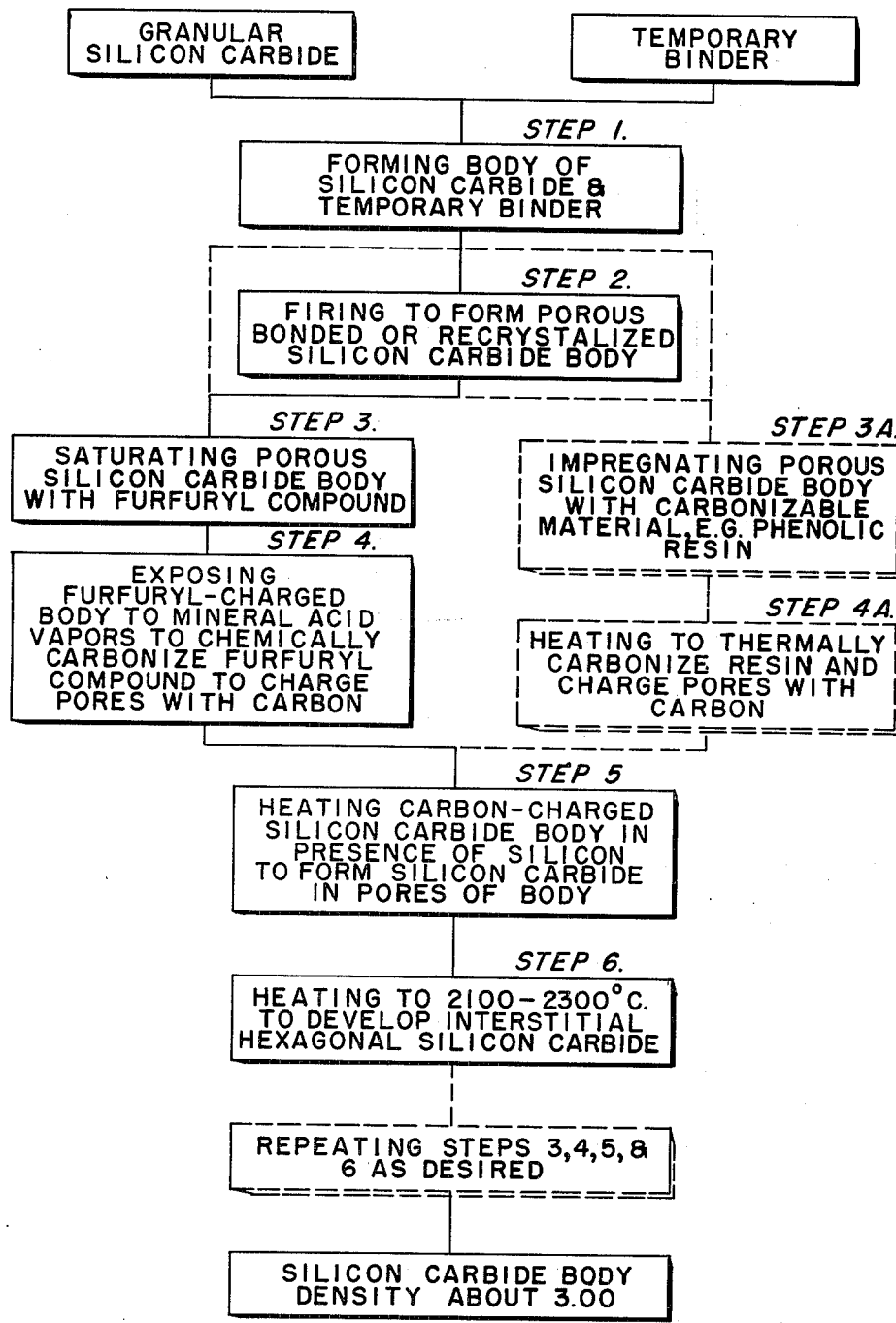

3,205,043
COLD MOLDED DENSE SILICON CARBIDE ARTICLES AND METHOD OF MAKING THE SAME
Kenneth M. Taylor, Lewiston, N.Y., assignor to The Carborundum Company, Niagara Falls, N.Y., a corporation of Delaware
Filed Apr. 4, 1962, Ser. No. 185,033
6 Claims. (Cl. 23—208)

This application is a continuation-in-part of my earlier application Serial No. 502,741, filed April 20, 1955, now abandoned, and Serial No. 694,063, filed October 31, 1957, now abandoned.

This invention relates to the manufacture of silicon carbide articles. More particularly, it pertains to new and improved dense silicon carbide articles composed essentially of silicon carbide and a new and improved method in which the articles are formed by cold molding and yet have a density comparable to that normally obtainable only by hot pressing.

Ever since the availability of silicon carbide as an industrial material, attempts have been made to mold or form it into bodies or shapes of extremely high density consisting substantially entirely of silicon carbide. Since silicon carbide does not soften under the application of heat and/or pressure the usual methods of obtaining high density such as by hot pressing have not been especially effective on a commercial basis in making articles from silicon carbide. Furthermore, it is extremely difficult, and in many instances impossible, to make certain shapes such as long slender tube forms, or other intricately formed articles by hot pressing procedures. Other attempts at making high density silicon carbide articles have also been made without success. For example, attempts have been made to make dense silicon carbide bodies by embedding molded shapes of silicon carbide in a conventional silicon carbide furnace within the mixture of coke and sand in the hope that the embedding mixture would be caused to vaporize and penetrate the silicon carbide structure and form additional silicon carbide within the pores. These efforts have never proved to be practical from the standpoint of obtaining acceptable results. There has long been and continues to be a need for a practical process for making extremely dense silicon carbide bodies consisting substantially entirely of silicon carbide.

It is therefore an object of the present invention to provide silicon carbide bodies of very high density, and a practical method of making such bodies.

It is also an object of the present invention to provide high-density silicon carbide bodies consisting essentially of silicon carbide and a method in which the high density of the body is obtained without resort to hot-pressing operations.

The accompanying drawing is directed to the flow diagram of the invention.

I have discovered that dense silicon carbide articles composed substantially entirely of silicon carbide and having a very high density comparable to the density heretofore considered to be obtainable only by hot pressing can be made by forming a bonded or recrystallized porous silicon carbide body structure of the desired shape, subsequently impregnating the pores of the body with a carbonizable material and carbonizing the same or otherwise loading the pores of the porous body with deposited carbon, and then heating the carbon-impregnated body in a silicon supplying environment essentially free of silica, for example in the presence of silicon, to cause the silicon to penetrate and react with the carbon within the pores of the body to form additional silicon carbide. It is necessary that the environment be essentially free of silica which would react with the carbon to form not only silicon carbide but also carbon monoxide. The evolution of this gas throughout the body would be self defeating as it would produce a porous structure, not the desired dense structure.

The body is preferably held at an elevated temperature around 2100–2300° C. for a sufficient period of time to cause the silicon carbide thusly formed to develop into the hexagonal crystalline habit. If desired, any small amount of residual free silicon which may be found in the pores of the article other than that which may be trapped or occluded in certain internal closed pores can be removed by leaching the resulting body with a mixture of hydrofluoric and nitric acids or by holding the article at sufficiently high temperature to volatilize most of the residual silicon. Although one such impregnation has usually been found to provide an article of sufficiently high density for most purposes, the entire impregnating procedure can be repeated if necessary to further increase the density of the finished body.

The porous silicon carbide body structure which is to be used as the base body structure of the article can be formed by any one of the conventional molding or forming procedures using any desired grit size or combination of grit sizes of silicon carbide together with a small amount of a temporary binder. The present process does not require the use of any specific grade or variety of silicon carbide although it is preferred to use a silicon carbide of relatively high purity such as that known in the trade as "green" grade of silicon carbide. The raw mixture of silicon carbide and temporary binder is pressed at high pressures, extruded or otherwise suitably molded to the desired shape, dried and fired to remove the temporary binder and form a bonded or recrystallized porous silicon carbide body structure of the desired shape. For example, very satisfactory porous silicon carbide body structures suitable for use in practice of the present invention are obtained by cold pressing, followed by drying and firing at about 2300° C. to drive off the temporary binder and recrystallize the silicon carbide. Such bodies may have a porosity in the neighborhood of 25–30%. While firing at around 2300° C. results in a porous body in which the silicon carbide is held together by recrystallization it is not essential that recrystallizing temperatures be employed to form the porous silicon carbide body structure. The molded shape can be bonded into a porous structure and fired at lower temperature below those at which recrystallization takes place and the resulting bonded shape satisfactorily used in making articles in accordance with the present invention.

Porous silicon carbide body structures for practicing the present invention can also be made by forming the initial porous body from a mixture of silicon carbide and elemental silicon and firing the molded article in a carbonaceous atmosphere at a temperature around 1350° C. to convert the silicon to silicon carbide. The resulting porous bonded silicon carbide shape is then impregnated with carbon and siliconized as will be hereinafter described.

While my preferred practice is to fire the molded silicon carbide shape prior to loading the pores with carbon because of the advantages of greater handling strength and clearance of volatile parts of any temporary binder from the pores making impregnation of the pore structure that much easier it is possible to introduce all of the carbon into the body of the article prior to the initial firing step. This can be done, for example, by using dextrin, a resin, or like material, as a temporary binder for the silicon carbide. The temporary binder is set to hold the silicon carbide in a shape. The shape can then be impregnated, with a carbonizable material, which will be carbonized during firing to deposit carbon in the interstices between granules of silicon carbide.

The second step of the present process, having obtained a porous body structure consisting substantially entirely of silicon carbide, is the loading of the pores of the porous silicon carbide body structure with carbon. This is usually done by charging the body with a carbonizable organic material which is then chemically or thermally carbonized to provide a filling of carbon within the pores of the silicon carbide structure. One very satisfactory method of loading the pores of the porous silicon carbide body with carbon is to fill the pores of the body with a furfuryl compound such as furfural and/or furfuryl alcohol and then expose the treated body to hydrochloric acid or other mineral acid vapors to precipitate carbon within the body by chemical carbonization of the furfuryl compound. Another method of introducing a carbonizable material into the porous silicon carbide body structure is to treat the porous body with an organic resinous compound such as a liquid phenol-formaldehyde resinous condensation product and then heat the treated body to thermally decompose and carbonize the resinous material and thus load the pores with carbon. Still a third method of depositing carbon in the pores of the body is by heating the body in a carbonaceous gas such as methane or acetylene at a temperature at which the gas will break down and deposit carbon within the pores. Deposition of the desired amount of interstitial carbon can be accomplished in one or more treatments of the porous body prior to the later siliconizing step. Optimum results in respect of high density of the final product are obtained when sufficient carbon is introduced into the pores that upon subsequent heating in the presence of silicon the silicon carbide formed within the pores of the body structure substantially fills the interstitial space. In other words, the carbon prior to siliconizing should not fill the pores of the original silicon carbide body to the extent that the silicon cannot penetrate the body during the siliconizing step. Preferably, the carbon present should be between 85% and 95% of the stoichiometric amount of carbon that is required to react with silicon to form sufficient silicon carbide completely to fill the pores to form a solid, non-porous body of silicon carbide. When the carbon is in this specified range, the resultant silicon carbide bodies have optimum density properties. Best results are obtained when the carbon is about 90% of the said stoichiometric amount.

The third step of the present process is the conversion of the interstitial carbon deposited in the porous silicon carbide body structure to additional silicon carbide. This is accomplished by heating the impregnated shape at an elevated temperature of about 2000° C. in a silicon-supplying environment essentially free of silica, for example, in the presence of elemental silicon or a source of elemental silicon such as silicon nitride which will dissociate to provide elemental silicon, whereupon the silicon will penetrate the body and react with the carbon within the pores of the body to form silicon carbide. While this penetration and reaction can be caused to take place in a relatively short time in which case the thusly formed silicon carbide developed within the pores of the article is of the cubic crystalline habit, best results in the obtaining of articles of extremely high density for most purposes are obtained by holding the article at an elevated temperature around 2100–2300° C. for a sufficient length of time to cause the interstitial silicon carbide after it is formed to convert to silicon carbide of the hexagonal crystalline habit. Holding the article at sustained high temperatures also aids further recrystallization and better bonding of the newly formed silicon carbide with the original silicon carbide of the body structure. Maintaining of the article at such elevated temperature for the additional period of time further serves to volatilize off any excess of silicon in or on the article. However, most of the residual free silicon other than that trapped in enclosed pores can be otherwise removed by leaching the fired article with a mixture of hydrofluoric and nitric acids. If the resulting article does not have a sufficiently high density following the initial siliconizing operation, the impregnating procedure can be repeated to further increase the density.

The following specific examples serve to further illustrate the exact manner in which the present invention is practiced.

*Example I*

The following mixture and procedure have been used in making dense silicon carbide crucibles suitable, among other purposes, for the melting of very high purity silicon.

| | Parts by weight |
|---|---|
| Silicon carbide, 100 grit mesh size | 55 |
| Silicon carbide, 220 grit mesh size | 15 |
| Silicon carbide, 3F grit mesh size | 15 |
| Silicon carbide, 1000 grit mesh size | 15 |
| Phenolic resin temporary binder | 2 |
| Pine oil | 10 |

The above mix is cold pressed at 5000–10,000 pounds per square inch to form a small crucible shape approximately 2″ high and 1¼″ diameter with a wall thickness of approximately 3/16″. The molded article is oven-dried to remove the volatiles of the temporary binder and fired at a temperature of 2300° C. in the normal atmosphere of a high-frequency furnace to drive off the residual volatile temporary binder and recrystallize the silicon carbide. The resulting porous recrystallized silicon carbide shape has a porosity of from 25–30%.

The resulting porous silicon carbide body structure is then soaked in furfural or furfuryl alcohol and the saturated body exposed to hydrogen chloride vapors to carbonize the furfural or furfuryl alcohol, after which the article is oven-dried to remove any residual volatile matter. Impregnation with furfuryl compound and carbonization can be repeated until the required amount of carbon is deposited in the pore structure.

The thusly prepared body is then heated to about 2100–2300° C. in a graphite crucible in an induction furnace in the presence of silicon which penetrates the pores of the porous body and reacts with the carbon contained therein to form additional silicon carbide in the pores of the porous silicon carbide body structure. The article is held at 2300° C. or above for approximately ½ hour to allow time for the silicon carbide formed within the pores of the article to convert to silicon carbide of the hexagonal crystalline form and also to drive off residual unreacted silicon. Most of the residual silicon can also be removed by leaching the article with a mixture of nitric and hydrofluoric acids.

Small silicon carbide crucibles made in accordance with the above procedure are composed substantially entirely of silicon carbide which is self bonded by recrystallization, together with a small amount of residual silicon usually not amounting to more than 5%. The final product has a density of as high as 3.00 and even as high as 3.05.

*Example II*

Using the same mix used in Eaxmple I and forming a recrystallized silicon carbide by cold pressing and recrystallization in the same manner therein described, the resulting porous recrystallized silicon carbide body is charged with carbon by impregnating the body with a liquid phenol-formaldehyde condensation product resin such as that known and sold by Varcum Chemical Corp. of Niagara Falls, N.Y. under the designation #8121 liquid phenolic resin. The impregnated body is fired to a temperature of 800° C. to carbonize the resin and deposit carbon within the pores of the body. The resulting carbon-loaded silicon carbide body structure is then heated in the presence of silicon and further processed in accordance with the procedure set forth in Example I above. The resulting crucible or other shape has the same physical characteristics of high density and impermeability shown for the articles made in accordance with Example I wherein the carbon loading is accomplished by chemical carbonization of furfural by mineral acid fumes.

*Example III*

A dextrin-bonded disc was made from the following mix:

| | Parts by weight |
|---|---|
| Silicon carbide, 14–36 grit mesh size | 47 |
| Silicon carbide, 80 grit mesh size and finer | 43 |
| Silicon carbide, 3F grit mesh size | 10 |
| Dextrin | 2.5 |
| Water | 3.0 |

This mix was molded and oven cured to form a self-sustaining disc that was strong enough to be handled. The weight of the disc was 156.0 grs., including 152.1 grs. of silicon carbide and 3.9 grs. of dextrin.

The disc had a volume of 63.0 cc. A pure, non-porous silicon carbide disc of the same size would weigh 203.0 grs. Therefore, 50.9 grs. of additional pure, non-porous silicon carbide would be required to render the disc non-porous. The theoretical amount of impregnated carbon can be calculated to be the weight of silicon carbide needed (50.9 grs.) multiplied by a factor of 0.30. To obtain optimum density, according to this invention, the theoretical amount is then multiplied by a factor of 0.9. The desired amount of carbon therefore is $$(50.9)(0.30)(0.9) = 13.8 \text{ grs.}$$

A liquid phenol-formaldehyde resin was heated to reduce its viscosity, and the disc was then impregnated with the heated resin, under vacuum. The impregnated disc was then left in an oven at 150° C. overnight. The disc was then heated in an oven at 700° C. to carbonize the resin.

Since the initial impregnation deposited only a few grams of carbon in the disc, from the resin and from the dextrin, the disc was again impregnated with the resin, cured, and fired at the carbonizing temperature of 700° C., a total of three times, to deposit the desired amount of carbon. The impregnated disc was then fired in the presence of silicon, to convert the impregnated carbon to silicon carbide.

The final weight of the disc was 200.10 grams, and its density was 3.18 grs./cc. The disc was cut with a diamond saw, and the exposed surfaces showed that substantially uniform impregnation, and conversion to silicon carbide, had occurred.

Dense silicon carbide bodies of the herein-described type are not only suitable for use in the making of small crucibles suitable for the melting of high-purity silicon and the like but are also useful for many purposes. Other uses for the material include nozzles for sandblasting and other applications where high resistance to erosion and/or corrosion are desired, heating elements and wear-resistant materials such as pestles and mortars, rocket nozzles and combustion chamber liners.

Having described the present invention in detail, it is desired to claim:

1. A dense article of manufacture composed substantially entirely of self-bonded silicon carbide, having a density of at least 3.00 and containing in addition to silicon carbide, an occluded small quantity of free silicon not amounting to more than 5 percent by weight of said article, and made by a process comprising the separate steps of cold pressing a porous mass consisting essentially of granular silicon carbide into a shape, then introducing a controlled amount of carbon into the pores of the shaped mass, said controlled amount of carbon being between 85 percent and 95 percent of the stoichiometric amount that is required to react with silicon to form sufficient silicon carbide to fill the pores and form a solid non-porous body of silicon carbide, and then heating said shaped mass to a temperature of at least 2000° C. in a silicon supplying environment essentially free of silica to cause the silicon to enter the pores of the shaped mass and react with the introduced carbon to form silicon carbide and thereafter maintaining the body at a temperature of about 2100° C. to 2300° C. for sufficient time to cause the silicon carbide so formed to go to the hexagonal crystalline form.

2. A method of making a high density silicon carbide article of manufacture having a density of at least 3.00, which comprises the separate steps of cold pressing a porous mass consisting essentially of granular silicon carbide into a shape, then introducing a controlled amount of carbon into the pores of the shaped mass, and then heating the shaped mass in a silicon supplying environment that is essentially free of silica to cause the silicon to enter the pores of the shaped mass and react with the introduced carbon to form silicon carbide.

3. A method of making a high density silicon carbide article of manufacture according to claim 2 wherein the introduction of a controlled amount of carbon into the pores of the shaped mass of silicon carbide is accomplished by a plurality of separate impregnation steps.

4. A method of making a high density silicon carbide article of manufacture having a density of at least 3.00, which comprises the separate steps of cold pressing a porous mass consisting essentially of granular silicon carbide into a shape, then introducing a controlled amount of carbon into the pores of the shaped mass, and then heating said shaped mass to a temperature of at least 2000° C. in a silicon supplying environment essentially free of silica to cause the silicon to enter the pores of the shaped mass and react with the introduced carbon to form silicon carbide, and thereafter maintaining the body at a temperature of about 2100° C. to 2300° C. for a sufficient time to cause the silicon carbide so formed to go to the hexagonal crystalline form.

5. A method of making a high density silicon carbide article of manufacture having a density of at least 3.00, which comprises the separate steps of cold pressing a porous mass consisting essentially of granular silicon carbide into a shape, then introducing a controlled amount of carbon into the pores of the shaped mass, said controlled amount of carbon being between 85 percent and 95 percent of the stoichiometric amount that is required to react with silicon to form sufficient silicon carbide to fill the pores and form a solid non-porous body of silicon carbide, and then heating said shaped mass to a temperature of at least 2000° C. in a silicon supplying environment essentially free of silica to cause the silicon to enter the pores of the shaped mass and react with the introduced carbon to form silicon carbide, and thereafter maintaining the body at a temperature of about 2100° C. to 2300° C. for a sufficient time to cause the silicon carbide so formed to go to the hexagonal crystalline form.

6. A method of making a high density silicon carbide article of manufacture according to claim 5 wherein the introduction of a controlled amount of carbon into the pores of the shaped mass of silicon carbide is accomplished by a plurality of separate impregnation steps.

References Cited by the Examiner

UNITED STATES PATENTS

| | | | |
|---|---|---|---|
| 913,324 | 2/09 | Tone | 23—208 |
| 966,399 | 8/10 | Higgens | 23—208 |
| 992,698 | 5/11 | Tone | 23—208 |
| 1,013,701 | 1/12 | Tone | 23—208 X |
| 1,266,478 | 5/18 | Hutchins | 23—208 |
| 2,188,693 | 1/40 | Thompson | 25—157 |
| 2,431,326 | 11/47 | Heyroth | 23—208 X |
| 2,614,947 | 10/52 | Heyroth | 23—209.2 X |
| 2,431,327 | 11/57 | Geiger | 23—208 X |
| 2,938,807 | 5/60 | Andersen | 106—44 |
| 3,007,805 | 11/61 | Cline | 106—44 |
| 3,079,273 | 2/63 | Johnson | 106—44 X |

MAURICE A. BRINDISI, *Primary Examiner.*